United States Patent Office 2,974,840
Patented Mar. 14, 1961

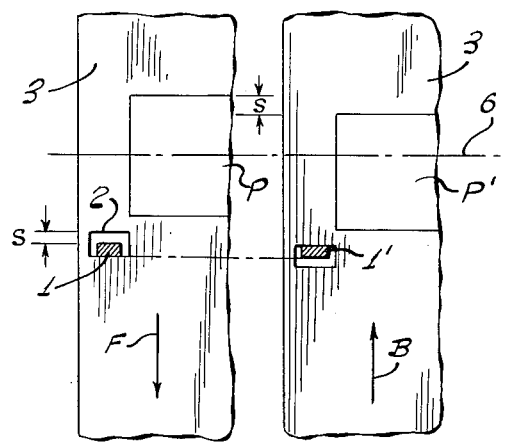
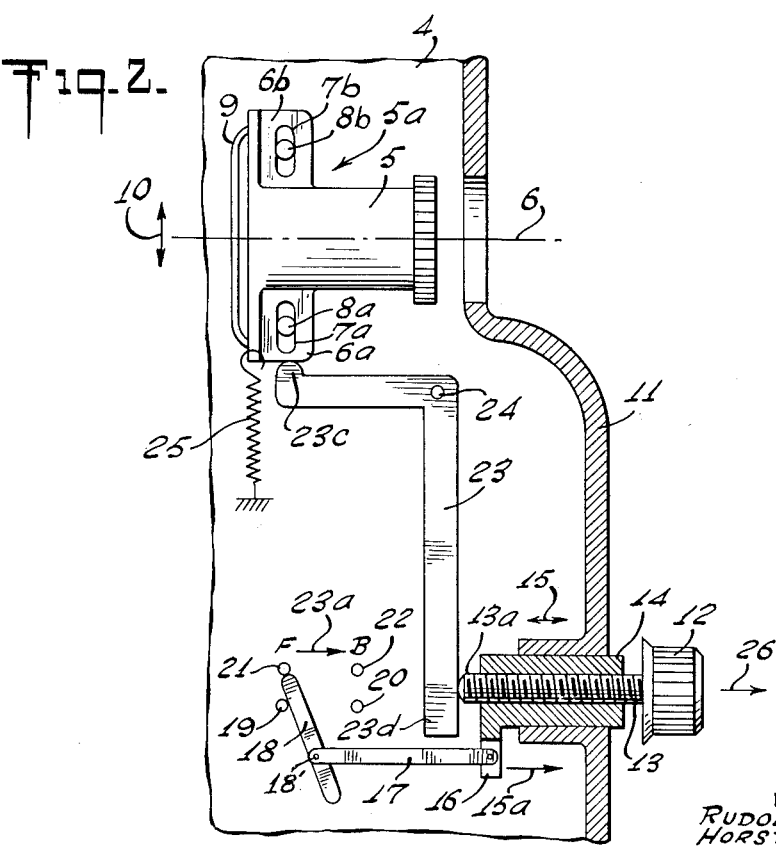

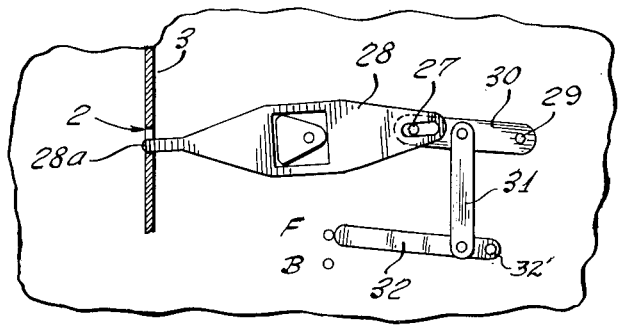
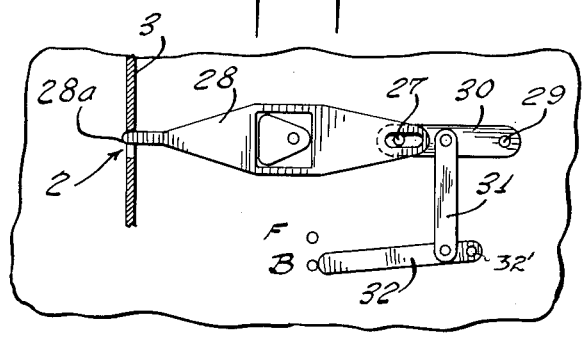

2,974,840

MOTION PICTURE PROJECTOR

Rudolf Kuhnert and Horst Stuhmke, Dresden, Germany, assignors to VEB Kamera- und Kinowerke Dresden Filed Oct. 24, 1957, Ser. No. 692,179

Claims priority, application Germany Dec. 28, 1956

1 Claim. (Cl. 226—49)

This invention relates to motion picture projectors.

It is an object of this invention to provide a motion picture film strip control apparatus adapted to compensate for film slippage induced when the direction of movement of the film is reversed.

It is a further object of this invention to provide control means to vary the position of the projector lens relative to the film strip as the direction of the film strip is reversed to compensate for the slippage in the film strip induced by the reversing of the direction of movement.

It is yet another object of this invention to provide suitable connecting means whereby the position of the film strip claws will be adjusted to compensate for the reversal of direction in the film strip which normally causes a slippage in the film strip with relation to the optical axis of the lens.

For other objects and a better understanding of the invention, reference may be had to the following detailed description, taken in connection with the accompanying drawings, in which:

Fig. 1 is a diagrammatic view showing the film strip moving in the forward and reverse direction;

Fig. 2 is a side view partly in section showing the invention;

Fig. 3 is a side view partly in section showing a modification of the invention; and Fig. 4 is a side view partly in section showing the invention in Fig. 3, after a reversal of direction.

In order to produce trick effects with a motion picture camera, it is a well known expedient to provide the projector with a drive mechanism capable of moving the film strip in a reverse direction. In this manner, the film strip may be fed through the projector in either a forward or reverse direction so as to produce novel visual effects.

It is usual to provide the film strip with a series of perforations which are gripped by a claw arrangement or teeth of a sprocket whereby the film is driven in the selected direction.

In such an apparatus, a disadvantage occurs as illustrated in Fig. 1, in that a displacement of the film strip is caused during the reversing action which must be compensated for or corrected manually.

The film strip 3 which contains a plurality of frames P has a series of perforations 2 through which the gripper claw or tooth 1 extends to direct the film strip in the direction indicated in F (Fig. 1). It is noted that in this case the frame P is centered along the optical axis 6 of the projector lens. When a reversal of the drive is effected and the claw moves into the position indicated at 1' (Fig. 1), the gripper claw then in order to effect movement, would have to engage the upper edge of the perforation 2 of strip 3. Therefore, a slippage or slack displacement indicated at S (Fig. 1) results.

As seen in Fig. 1, the optical axis 6 of the projector lens is no longer at the center of frame P' (i.e., when the film strip has been directed to move in the direction B, reverse of the direction F). This displacement S has to be compensated for by a manual adjustment in order to bring the frame P' into correct alignment with the optical axis 6.

In accordance with the invention, the reversing mechanism for the forward and backward drive movement of the film strip is coupled to a device which effects correction of the slippage of the film frame position. This coupling device corrects and compensates for the slippage of the film frame automatically upon the selection of the direction of movement.

Referring now to Fig. 2, there is shown a side wall 4 and end wall 11 of a motion picture projector. It being understood only these parts of the mechanism which is felt essential to the description of the invention has been reproduced and only that portion felt necessary for an understanding of the invention will be hereinafter described.

The optical lens 5 for the projector, which is laterally adjustable, is mounted to the framework 5a of the projector. By means of mounting brackets 6a, suitably and fixedly mounted to the framework, the framework 5a and lens 5 are vertically adjustable relative to the optical axis 6 as will be hereinafter described.

Brackets 6a and 6b have two slits 7a and 7b, the long axes of which are perpendicular to the optical axis 6, into which project the lugs or guide members 8a and 8b which are in turn secured to side wall 4. The image mask or shield 9 is likewise mounted to the framework 5a and together with the lens 5 is displaced upon adjustment, to be hereinafter described, at the same time as is the framework 5a.

On the front wall of the projector 11 there is mounted a conventional adjustment button 12. This button which is rotatable, may through suitable linkage to be hereinafter described, indicate or select the direction of movement 10 that the film strip 3 will take relative to the mask or shield 9 and the lens 5.

The button 12 has a threaded stem 13 which is guided in the threads provided in sleeve 14. The sleeve 14 is itself mounted in wall 11 so as to be slidable in the direction of the arrow 15, 15a. Suitable means may be provided to secure this sleeve in position at any desirable point.

To a downwardly extending arm 16 of sleeve 14, is mounted, by suitable means, a connecting link or rod 17. To the extremity of rod 17 is suitably attached the actuating control level 18 which is pivotally mounted by means of a pin 18' so that upon a lateral displacement of the rod 17 the control lever 18 (shown in Fig. 2 as being in engagement with contact 21 against stop 19) would be shifted in the direction of arrow 23a so as to come into contact with contact 22 against stop 20. In this way, reversal of the motion picture drive would be effected by the reversal of contacts.

By means of a stud 24 mounted on wall 4, and L-shaped bell crank lever 23 is rotatably mounted. The extremity 23c of the upper arm of this bell lever 23 is positioned substantially below and abuts against the lower portion of supporting bracket 6a. A tension spring 25, with one end secured to the framework 5a of the picture lens, generally causes the framework to the held downward against the bell crank or lever 23. The other extremity 23d is disposed opposite to but in engagement with the inner extremity 13a of stem 13.

In operation, by rotating button 12, frame adjustment relative to the optical axis 6 may be obtained through the screw action of stem 13. The extremity 13a of stem 13 moves in the direction of arrow 15 against extremity 23d of lever 23 and will pivotally rock the lever 23 to slightly raise the framework 5a to maintain the individual frames in alignment with the optical axis 6. It being understood that by moving stem 13 in the direction of arrow 15a the framework 5a would be lowered.

If, it is desired to move the control lever 18 from contact 21 to 22, as hereinabove described, to effect a reversal in the movement of the film strip, an inward pressure on the button 12 will cause the stem 13 and its threaded sleeve to slide inwardly and through the linkage, hereinabove described, causing shifting of the control arm 18 from contact 21 to contact 22. At the same time the inner extremity of stem 13 forces a pivoting action of the bell crank lever 23, as hereinabove described, and through the extremity 23c abutting against brackets 6a, overcomes the tension of spring 25 and shifts the carrier frame up a predetermined distance. In this manner, the slippage "S" hereinabove described, due to the reversal of the drive, will be overcome and the frames will automatically remain in alignment with optical axis 6. Further minor corrections of this frame adjustment may be made by subsequent rotation of the button 12 which through the stem extremity 23c will correct minor errors of frame position incurred by the position change of lens 5 as pivoting bell lever 23 raises the framework 5a.

In order to reverse the procedure by withdrawing on the button 12 in the direction of arrow 26, the lever 18 will return to the position as indicated in Fig. 2 and the bell crank 23 will also return to the position as indicated in Fig. 2, under the action of spring 25. Thereby the carrier framework 5a will be drawn downwardly and thus automatic repositioning of the film frame with the optical axis will be regained as generally indicated in Fig. 2.

Thus, an automatic correction for the slippage has been provided for. The frames through which the picture is being projected will be maintained in alignment with the optical axis 6 by reason of the fact that the optical axis has been shifted to compensate for the slippage "S" in the claws 1 as they grip the perforations 2.

Illustrated in Figs 3 and 4, is a modification of this invention wherein it is contemplated that only a conventional reversing switch would be used in order to effect reversal of the film direction.

In accordance with the embodiments shown in Figs. 3 and 4, the correction of the slippage may be effected by displacing the supporting axis 27, about which the grippers perform their oscillating movement. This supporting axis 27, about which the gripper 28 would effect its rocking motion, is mounted on lever 30, pivotal about stud 29. The lever 30 is connected by a coupling link 31 to the control arm 32 which is pivotally mounted about a pin 32′ fixed to the housing.

By means of a switch (not shown) suitably linked to the control arm 32, this arm may be shifted from the position indicated in Fig. 3 (forward movement) to the position of Fig. 4 (reverse movement). Through the linkage hereinabove described, the supporting axis 27 is displaced downwardly (from its Fig. 3 position to its Fig. 4 position) and this results in the displacement of the claw or gripper tips upwardly (from its Fig. 3 position to its Fig. 4 position), a corresponding distance.

This automatic shifting of the supporting axis causes the tips 28a to be repositioned from abutting the lower edge of perforation 2 (Fig. 3) to abut the upper edge of perforation 2 (Fig. 4). Thus the slippage "S" is automatically corrected.

It is understood that a reversal of the above procedure would result in an opposite movement of tips 28a and provide for correct positioning of these tips depending upon the position of lever 32.

If, however, in the practice of this invention, reversal is to be accomplished by mechanical reversing elements rather than electrically, the mechanical elements are connected to the coupling rod 17 or lever 32.

For reasons of convenience it is believed that when ordinary frame correction is desired and a manually controlled reversing button is to be used, the film frame adjustment by displacement of the optical axis (in accordance with the embodiment of Fig. 2) would be preferable. However, when it is feasible to provide for an automatic reversal of the film upon reaching a predetermined point, usually the end of the reel and to rewind it automatically, it is believed the automatic adjustable gripper (of Figs. 3 and 4) would be preferable. This would be particularly true when the reversal of the film is to be effected electrically, wherein the modification as shown in Figs. 3 and 4 is also believed to be the more preferable.

While various changes may be made in a detailed construction, it shall be understood that the invention is not limited to the structure shown but that the spirit and scope of the present invention is limited as defined by the appended claim.

I claim:

A motion picture projector including picture projecting means, means for driving a film strip through said picture projecting means including at least one oscillating actuating gripper, selecting means enabling the operator to determine the direction of film strip movement caused by said drive means, positioning means to maintain the film strip in correct alignment with the optical axis of said picture projecting means when the direction of movement of the film strip is caused to reverse by operation of the selecting means, said positioning means including means for adjusting the position of the supporting axis of the actuating gripper, a control arm selecting the direction of movement of the drive means and connecting means coupling the control arm and the adjusting means whereby upon selection of the direction of movement of the film strip, the position of the supporting axis of the actuating gripper will be determined.

References Cited in the file of this patent

UNITED STATES PATENTS

| | | |
|---|---|---|
| 740,318 | Scherf | Sept. 29, 1903 |
| 986,857 | Pink | Mar. 14, 1911 |
| 1,018,827 | Ivatts | Feb. 27, 1912 |
| 1,277,195 | Connor et al. | Aug. 27, 1918 |
| 1,942,231 | Wittel | Jan. 2, 1934 |
| 2,505,965 | Holmes | May 2, 1950 |

FOREIGN PATENTS

| | | |
|---|---|---|
| 653,121 | Great Britain | May 9, 1951 |